United States Patent
Morita et al.

(10) Patent No.: US 10,723,650 B2
(45) Date of Patent: Jul. 28, 2020

(54) OPTICAL FIBER PREFORM

(71) Applicant: SUMITOMO ELECTRIC INDUSTRIES, LTD., Osaka-shi, Osaka (JP)

(72) Inventors: Keisei Morita, Osaka (JP); Yoshiaki Tamura, Osaka (JP); Hirotaka Sakuma, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 139 days.

(21) Appl. No.: 16/031,319

(22) Filed: Jul. 10, 2018

(65) Prior Publication Data

US 2019/0016630 A1 Jan. 17, 2019

(30) Foreign Application Priority Data

Jul. 12, 2017 (JP) ................................. 2017-136315

(51) Int. Cl.
*C03C 13/04* (2006.01)
*C03C 3/06* (2006.01)
*C03B 37/012* (2006.01)

(52) U.S. Cl.
CPC ........ *C03C 13/046* (2013.01); *C03B 37/0124* (2013.01); *C03B 37/01228* (2013.01); *C03B 37/01248* (2013.01); *C03C 3/06* (2013.01); *C03C 13/045* (2013.01); *C03B 2201/12* (2013.01); *C03B 2201/20* (2013.01); *C03B 2201/50* (2013.01); *C03B 2201/54* (2013.01); *C03B 2203/29* (2013.01);

(Continued)

(58) Field of Classification Search
CPC ....... C03C 13/046; C03C 13/045; C03C 3/06; C03B 37/01228; C03B 37/0124; C03B 37/01248
USPC .......................................................... 428/375
See application file for complete search history.

(56) References Cited

U.S. PATENT DOCUMENTS

| 2006/0130530 A1 | 6/2006 | Anderson et al. |
| 2016/0147010 A1 | 5/2016 | Tamura et al. |
| 2016/0318793 A1 | 11/2016 | Tamura et al. |

FOREIGN PATENT DOCUMENTS

| JP | 2005-537210 A | 12/2005 |
| JP | 2009-541796 A | 11/2009 |
| JP | 2012-229150 A | 11/2012 |

(Continued)

*Primary Examiner* — Vincent Tatesure
(74) *Attorney, Agent, or Firm* — Faegre Drinker Biddle & Reath LLP (57) ABSTRACT

An optical fiber preform includes a silica-glass core portion, and a cladding portion surrounding the core portion, the cladding portion being composed of a fluorine-containing silica glass having a lower refractive index than the core portion, the core portion including a first region that does not include the central axis thereof, the first region containing a first dopant selected from sodium, potassium, and compounds thereof, and a second region that includes the central axis, the second region containing a second dopant that reduces the viscosity of the silica glass, the second dopant having a diffusion coefficient of $1\times10^{-12}$ cm$^2$/s or more and less than the first dopant at 2,000° C. to 2,300° C., in which the entire core portion has an average first dopant concentration of 10 atomic ppm or more and 2,000 atomic ppm or less and an average second dopant concentration of 10 atomic ppm or more.

10 Claims, 7 Drawing Sheets

(52) U.S. Cl.
CPC ...... *C03C 2201/11* (2013.01); *C03C 2201/12* (2013.01); *C03C 2201/50* (2013.01); *C03C 2201/54* (2013.01)

(56) References Cited

FOREIGN PATENT DOCUMENTS

| | | |
|---|---|---|
| JP | 2016-210632 A | 12/2016 |
| WO | WO-2004/020357 A2 | 3/2004 |
| WO | WO-2007/149344 A1 | 12/2007 |

| ATOM | Na | K | Cs | Ca |
|---|---|---|---|---|
| DIFFUSION COEFFICIENT cm²/s | $6\times10^{-5}$ | $4\times10^{-6}$ | $2\times10^{-6}$ | $6\times10^{-7}$ |

OPTICAL FIBER PREFORM

BACKGROUND OF THE INVENTION

Field of the Invention

The present invention relates to an optical fiber preform.

Description of the Related Art

As optical fibers with a low Rayleigh scattering loss and a low attenuation, silica-based optical fibers each having a core containing an alkali metal element are known (for example, see Japanese Unexamined Patent Application Publication No. 2005-537210, US Patent Application Publication. No. 2006/0130530, Japanese Unexamined Patent Application Publication No. 2009-541796, Japanese Unexamined Patent Application Publication No. 2012-229150, and Japanese Unexamined Patent Application Publication No. 2016-210632). The incorporation of an alkali metal element in a core portion of an optical fiber preform can reduce the viscosity of the core portion when the optical fiber preform is drawn, thus uniformizing the network structure of a silica glass to reduce the Rayleigh scattering loss due to the fluctuation of the structure.

As a method for adding an alkali metal element to a silica glass, a diffusion method is known. The diffusion method is one in which an alkali metal element is diffused and added to the inner surface of a glass pipe by heating the glass pipe with an external heat source or generating plasma in the glass pipe while the vapor of a source material such as the alkali metal element or an alkali metal salt is introduced into the glass pipe.

After the alkali metal element is added to the vicinity of the inner surface portion of the glass pipe in the foregoing manner, the glass pipe is reduced in diameter by heating. After the reduction in diameter, the inner surface of the glass pipe is etched by a certain thickness in order to remove transition metals such as Ni and Fe inevitably added together with the addition of the alkali metal element. The diffusion of the alkali metal element is faster than that of the transition metals. Thus, even if the glass surface is etched by a certain thickness to remove the transition metals, the alkali metal element can be left. After the etching, the glass pipe is collapsed by heating into a solid core rod containing the alkali metal element. A glass to be formed into a second core portion may be formed on the outer side of the core rod containing the alkali metal element, and the whole of the core rod and the second core portion may be used as the core of an optical fiber.

A cladding portion having a lower refractive index than the core portion including the core rod containing the alkali metal element is formed on the outer side of the core portion to produce an optical fiber preform. The optical fiber preform can be drawn to produce an optical fiber.

An optical fiber preform disclosed in Japanese Unexamined Patent Application Publication No. 2016-210632 contains a first dopant (sodium or potassium) in a region including the central axis of a core portion, the first dopant having a high diffusion coefficient, and a second dopant in a region that does not include the central axis of the core portion, the second dopant (for example, Rb, Cs, Mg, Ca, or Sr) having a low diffusion coefficient. In Japanese Unexamined Patent Application Publication No. 2016-210632, when an optical fiber is produced by drawing the optical fiber preform, the first dopant and the second dopant are diffused by heating during the drawing to uniformize the concentration distribution of the alkali metal elements in the core of the optical fiber, thereby resulting in an optical fiber having a low attenuation.

SUMMARY OF THE INVENTION

It is an object of the present invention to provide an optical fiber preform from which an optical fiber having a lower attenuation can be provided.

One aspect of the present invention provides an optical fiber preform including a core portion composed of a silica glass and a cladding portion surrounding the core portion, the cladding portion being composed of a fluorine-containing silica glass having a lower refractive index than the core portion, the core portion including a first region that does not include a central axis of the core portion, the first region containing a first dopant selected from sodium, potassium, and compounds thereof, and a second region that includes the central axis of the core portion, the second region containing a second dopant that reduces viscosity of the silica glass, the second dopant having a diffusion coefficient of $1 \times 10^{-12}$ cm$^2$/s or more and less than the first dopant at a temperature of 2,000° C. to 2,300° C., in which the entire core portion has an average first dopant concentration of 10 atomic ppm or more and 2,000 atomic ppm or less, and the entire core portion has an average second dopant concentration of 10 atomic ppm or more. The term "atomic ppm" used here indicates the number of dopant atoms in 100 million units of $SiO_2$.

In the optical fiber preform according to the aspect of the present invention, the second dopant may be any one selected from Rb, Cs, Mg, Ca, and Sr. The first dopant has a peak concentration at a radius $r_1$ in the core portion and the core portion has an outer radius $r_2$, and the ratio ($r_2/r_1$) may be in the range of 3 to 9.5. The entire core portion may have an average Cl concentration of 10 atomic ppm or more and 10,000 atomic ppm or less.

DESCRIPTION OF THE PREFERRED EMBODIMENTS

Embodiments of the present invention will be described in detail below with reference to the attached drawings. In the drawings, the same elements are designated using the same reference numerals, and redundant description is not repeated. The present invention is not limited to these embodiments. The present invention is indicated by the appended claims. It is intended to include any modifications within the scope and meaning equivalent to the scope of the claims.

In an optical fiber produced by drawing an optical fiber preform disclosed in Japanese Unexamined Patent Application Publication No. 2016-210632, an alkali metal element (first dopant) having a high diffusion coefficient diffuses outside the core to decrease the concentration of the alkali metal element in the central portion of the core. In the power distribution of fundamental-mode light propagating through the core of the optical fiber, the power increases with decreasing distance from the center of the core. Thus, because of a low concentration of the alkali metal element in the central portion of the core where the power of the fundamental-mode light is high, a reduction in attenuation is not sufficient.

In the case where only an alkali metal element, such as sodium or potassium, having a high diffusion coefficient, is added to the core portion of the optical fiber preform, heating the optical fiber preform to a drawing temperature of 2,000° C. to 2,300° C. causes the alkali metal element to diffuse outside the core to decrease the concentration of the alkali metal element in the core of an optical fiber to be formed. Thus, the Rayleigh scattering coefficient (A value) is not sufficiently reduced, failing to sufficiently reduce the attenuation. The A value refers to the coefficient of the first term on the right-hand side in the approximate expression $\alpha = A\lambda^{-4} + B$, where a represents the loss of light transmitted in the optical fiber, and $\lambda$ represents the wavelength of the light.

In the case where only the alkali metal element having a high diffusion coefficient is added to the core portion of the optical fiber preform, the peak concentration of the alkali metal element in the core portion of the optical fiber preform should be increased in order to maintain a sufficient concentration of the alkali metal element in the core of a drawn optical fiber. In this case, unfortunately, a difficulty lies in drawing the preform into a fiber because of crystallization during the drawing.

In the case where only an alkali metal element or an alkaline-earth metal element, such as Rb, Cs, Mg, Ca, or Sr, having a low diffusion coefficient is added to the core portion of the optical fiber preform, even if the optical fiber preform is heated to a drawing temperature of 2,000° C. to 2,300° C., the alkali metal element or alkaline-earth metal element does not diffuse in the entire core of an optical fiber. Also in this case, the A value is not sufficiently reduced, thus failing to sufficiently reduce the attenuation.

As with the optical fiber preform disclosed in Japanese Unexamined Patent Application Publication No. 2016-210632, in the case where a region of a core portion including the central axis of the core portion contains a first dopant having a high diffusion coefficient and where a region of the core portion that does not including the central axis contains a second dopant having a low diffusion coefficient, an optical fiber formed by drawing the optical fiber preform has a low concentration of an alkali metal element in the central portion of its core where the power of fundamental-mode light is high. Thus, a reduction in attenuation is not sufficient.

An optical fiber formed by drawing an optical fiber preform according to an embodiment of the present invention described below has a high concentration of an alkali metal element or alkaline-earth metal element in the central portion of its core where the power of fundamental-mode light is high and has a sufficiently low attenuation.

Figure 1:
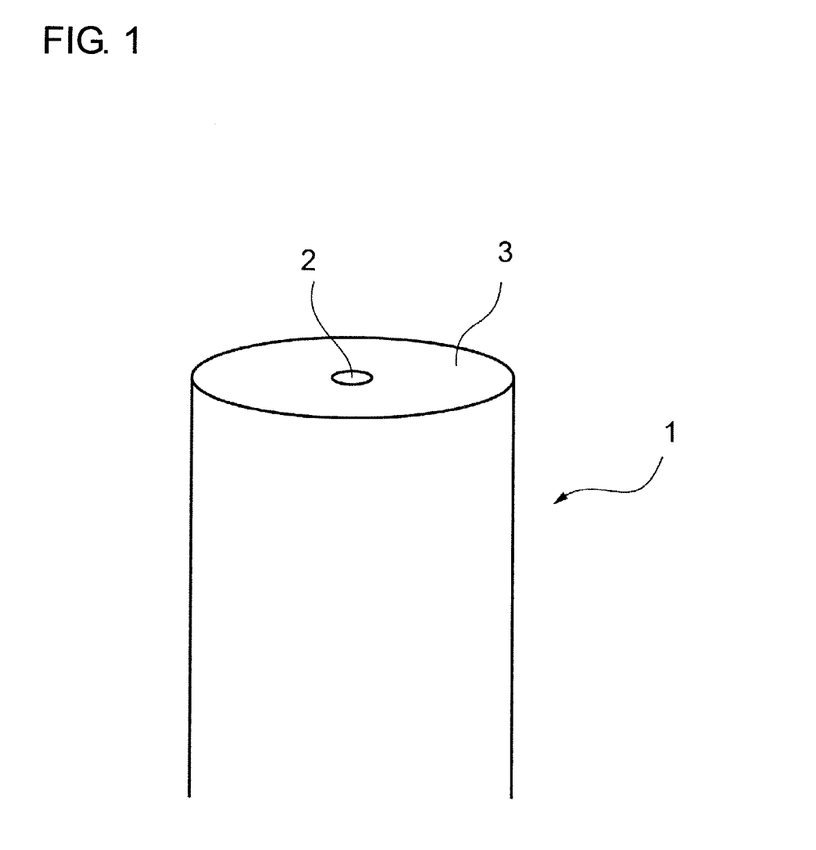
FIG. 1 is a conceptual diagram of an optical fiber preform according to an embodiment of the present invention.

FIG. 1 is a conceptual drawing illustrating an optical fiber preform 1 according to an embodiment of the present invention. The optical fiber preform 1 includes a core portion 2 composed of a silica glass and a cladding portion 3 surrounding the core portion 2, the cladding portion 3 being composed of a silica glass. The core portion 2 contains a first dopant and a second dopant that reduce the viscosity of the silica glass. The cladding portion 3 has a lower refractive index than the core portion 2 and contains fluorine.

Figure 2:
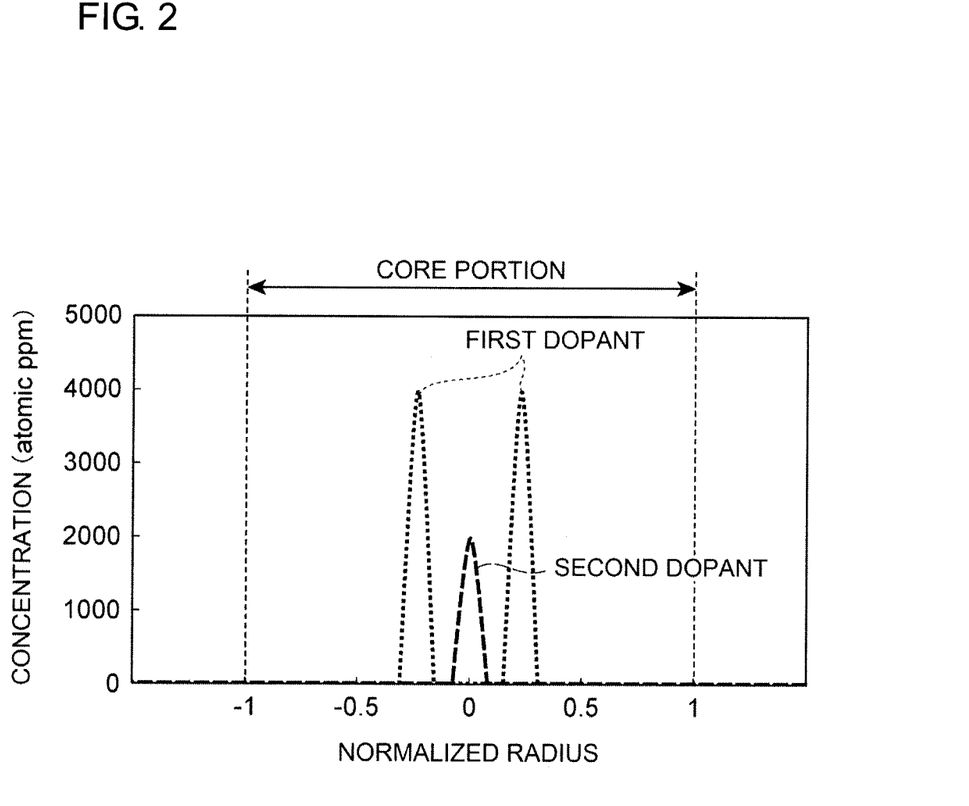
FIG. 2 is a graph illustrating a dopant concentration distribution in a core portion of an embodiment of the optical fiber preform illustrated in FIG. 1.

FIG. 2 is a graph illustrating a dopant concentration distribution in the core portion 2 of the optical fiber preform 1. The horizontal axis of FIG. 2 represents a distance from the center of the core portion 2 in a radial direction, the distance being normalized to the radius of the core portion 2 of the optical fiber preform 1.

The first dopant is selected from sodium, potassium, and compounds thereof and is contained in a first region of the core portion 2 that does not include the central axis of the core portion 2. The entire core portion 2 has an average first dopant concentration of 10 atomic ppm or more and 2,000 atomic ppm or less.

The second dopant is contained in a second region of the core portion 2 that includes the central axis of the core portion 2. The second dopant has a diffusion coefficient of $1 \times 10^{-12}$ cm$^2$/s or more and less than the first dopant at a heating temperature of 2,000° C. to 2,300° C. during drawing. The entire core portion 2 has an average second dopant concentration of 10 atomic ppm or more.

The entire core portion 2 preferably has an average Cl concentration of 10 atomic ppm or more and 10,000 atomic ppm or less. The second dopant is preferably any one selected from Rb, Cs, Mg, Ca, and Sr.

The first region (i.e., the region that does not include the central axis of the core portion 2) containing the first dopant and the second region (the region that includes the central axis of the core portion 2) containing the second dopant may overlap each other. Preferably, these regions do not overlap each other. In the case of the latter, no region containing both the first dopant and the second dopant is present. In the case of the latter, the optical fiber preform is more easily produced.

Figure 8:
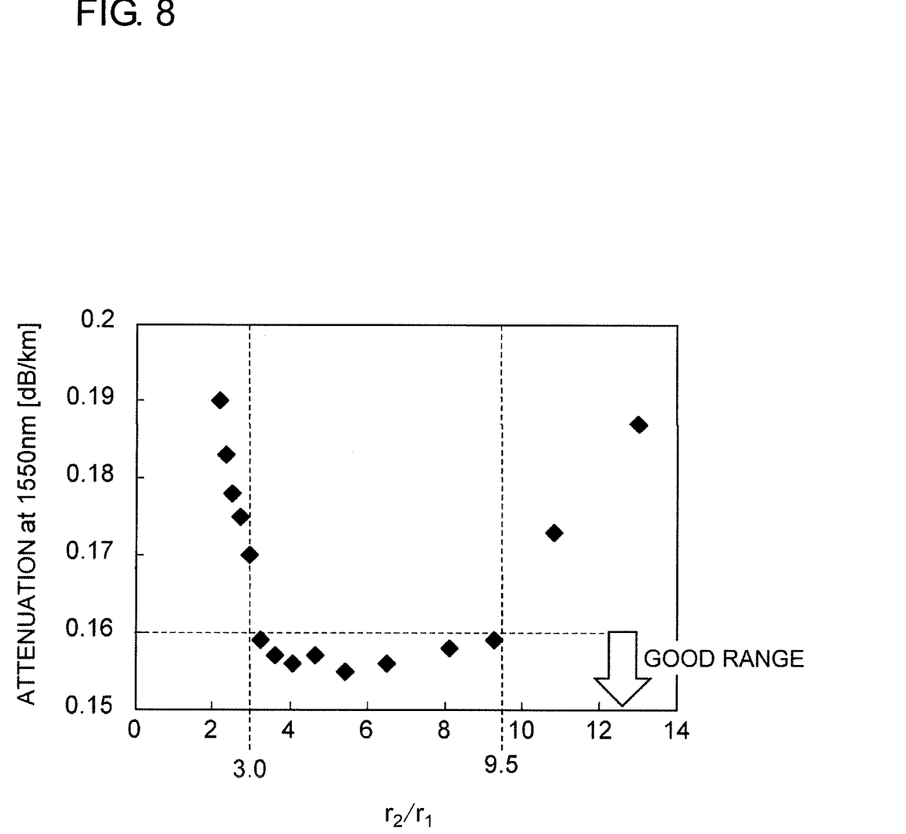
FIG. 8 is a graph illustrating the relationship between the attenuation of an optical fiber at a wavelength of 1,550 nm and the ratio (r2/r1) of the radius r2 of a core portion of an optical fiber preform to the peak concentration position r1 of a first dopant in the core portion.

FIG. 8 is a graph illustrating the relationship between the attenuation of an optical fiber at a wavelength of 1,550 nm and the ratio (r2/r1) of the radius r2 of a core portion of an optical fiber preform to the peak concentration position r1 of a first dopant in the core portion. As is clear from the graph, in the case where r2/r1 is less than 3, most of the first dopant diffuses outside the core by heating in a drawing step to decrease the effect of reducing the attenuation. In the case where r2/r1 is more than 9.5, even if the first dopant diffuses by heating in the drawing step, the first dopant does not extend throughout the core, thus decreasing the effect of reducing the attenuation. Accordingly, the ratio (r2/r1) of the radius r2 of the core portion to the peak concentration position r1 of the first dopant in the core portion of the optical fiber preform is preferably in the range of 3 to 9.5.

Figure 3:
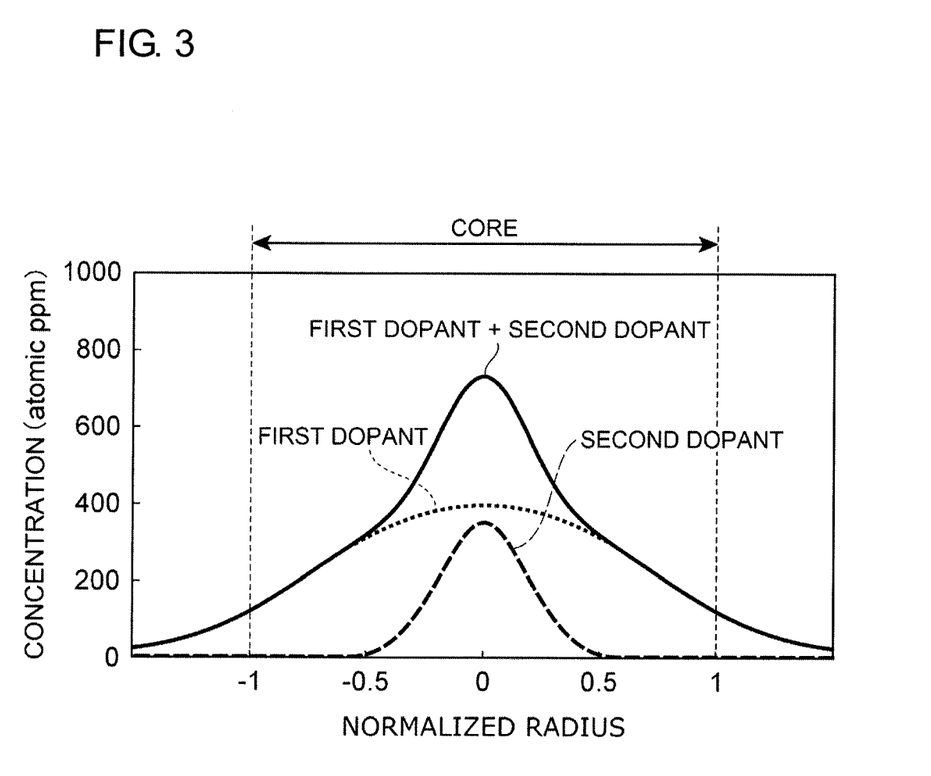
FIG. 3 is a graph illustrating a dopant concentration distribution in the core of an optical fiber formed by drawing the optical fiber preform illustrated in FIG. 1.

FIG. 3 is a graph illustrating a dopant concentration distribution in the core of an optical fiber formed by drawing the optical fiber preform 1. The horizontal axis of FIG. 3 represents a distance from the center of the core of the optical fiber in a radial direction, the distance being normalized to the radius of the core of the optical fiber.

The first dopant having a high diffusion coefficient diffuses into the core center and outside the core by heating during drawing and thus is distributed over a wide range from the core center to a region outside the core in the optical fiber. In the concentration distribution of the first dopant in the optical fiber, although the minimum value of the first dopant concentration can be obtained in the core center, the first dopant concentration can increase with decreasing distance from the core center.

In contrast, the second dopant having a low diffusion coefficient less diffuses by heating during the drawing. Thus, the concentration distribution of the second dopant in the optical fiber is within the core, and the concentration increases with decreasing distance from the core center.

The concentration distribution of the dopants (the first dopant+the second dopant) in the optical fiber extends over a wide range from the core center to the region outside the core in the optical fiber, and the concentration increases with decreasing distance from the core center. The concentration distribution of the dopants approximates to the power distribution of fundamental-mode light in the optical fiber. Because the dopant concentration is high in the core central portion where the power of the fundamental-mode light is high, a sufficiently low attenuation of the optical fiber can be provided.

Figure 4:
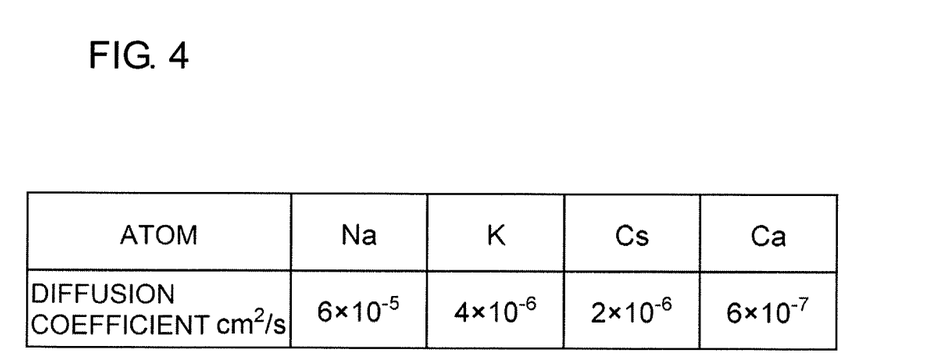
FIG. 4 is a table that lists the diffusion coefficients of sodium, potassium, cesium, and calcium.

FIG. 4 is a table that lists the diffusion coefficients of sodium, potassium, cesium, and calcium. The table presents the diffusion coefficients at 2,200° C. calculated by molecular dynamics simulation. Sodium or potassium is used as the first dopant. Cesium or calcium is used as the second dopant.

Figure 5:
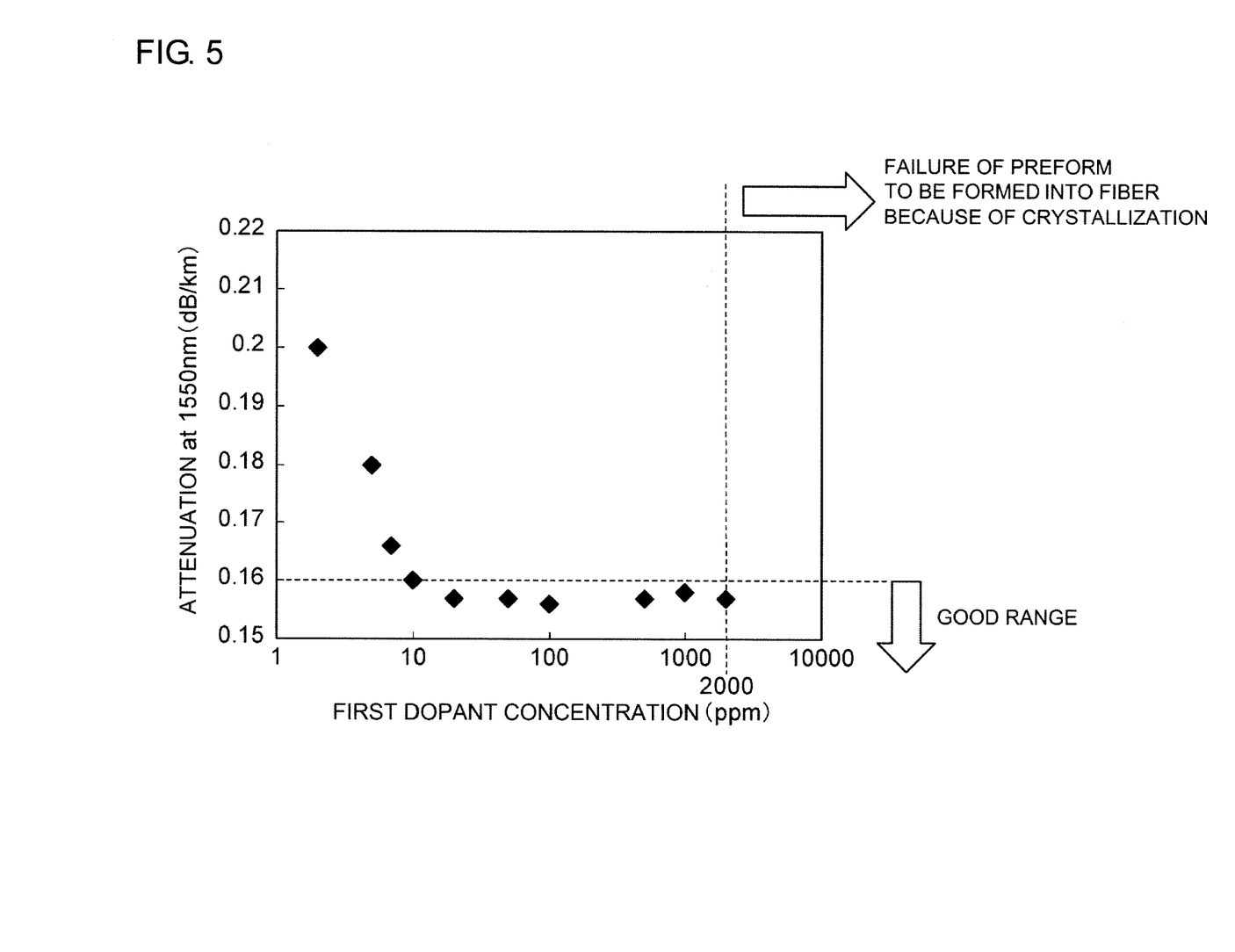
FIG. 5 is a graph illustrating the relationship between the attenuation of an optical fiber at a wavelength of 1,550 nm and the average concentration of a first dopant in the entire core portion of an optical fiber preform.

FIG. 5 is a graph illustrating the relationship between the attenuation of an optical fiber at a wavelength of 1,550 nm and the average concentration of the first dopant in the entire core portion of an optical fiber preform. As is clear from the graph, when the average first dopant concentration in the entire core portion of the optical fiber preform is 10 atomic ppm or more, the attenuation of the optical fiber at a wavelength of 1,550 nm is 0.16 dB/km or less. When the average first dopant concentration in the entire core portion of the optical fiber preform is more than 2,000 atomic ppm, the preform is easily crystallized, thus making it difficult to form the preform into a fiber. Accordingly, the average first dopant concentration is preferably 2,000 atomic ppm or less.

Figure 6:
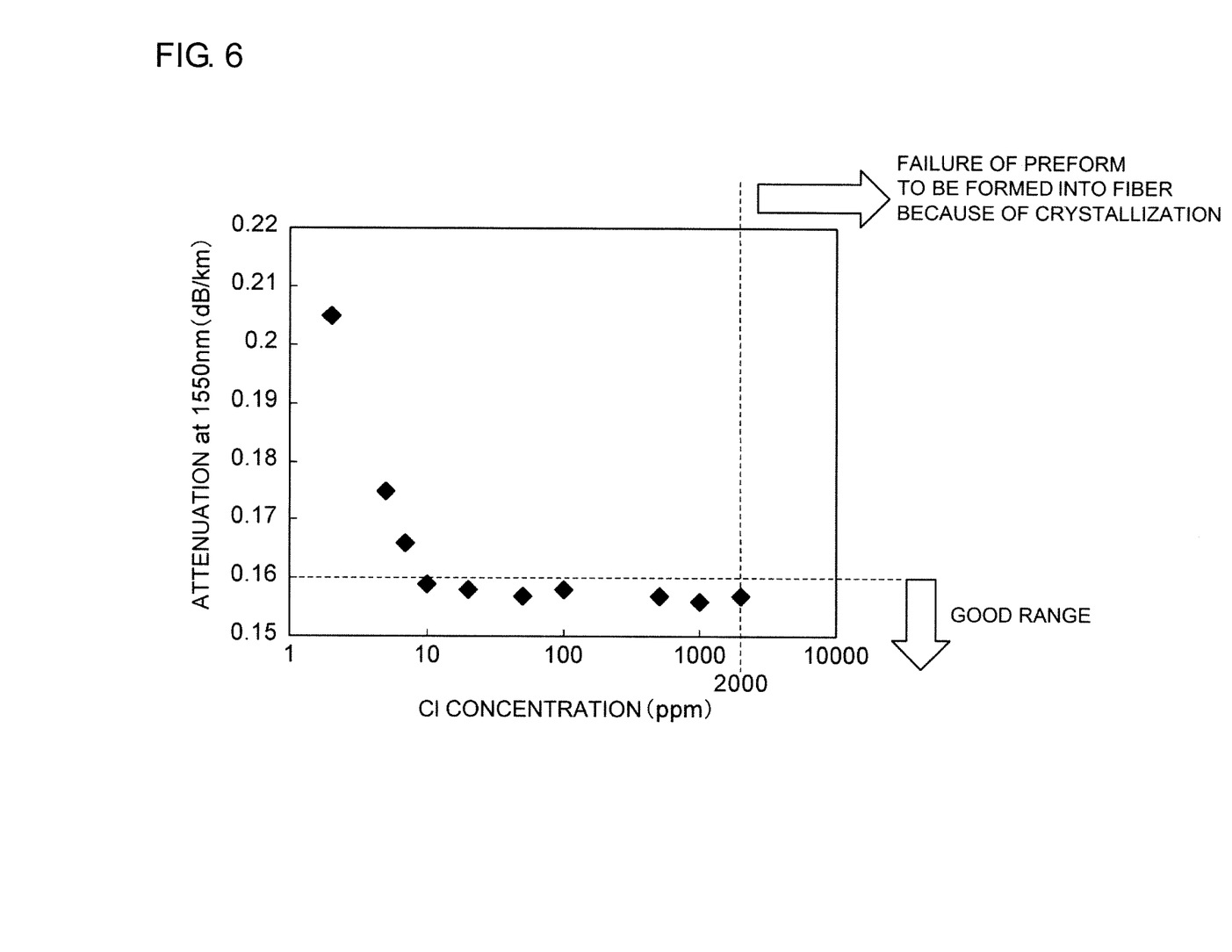
FIG. 6 is a graph illustrating the relationship between the attenuation of an optical fiber at a wavelength of 1,550 nm and the average Cl concentration in the entire core portion of an optical fiber preform.

FIG. 6 is a graph illustrating the relationship between the attenuation of an optical fiber at a wavelength of 1,550 nm and the average Cl concentration in the entire core portion of an optical fiber preform. As is clear from the graph, when the average Cl concentration in the entire core portion of the optical fiber preform is 10 atomic ppm or more, the attenuation of the optical fiber at a wavelength of 1,550 nm is 0.16 dB/km or less. When the average Cl concentration in the entire core portion of the optical fiber preform is more than 10,000 atomic ppm, the preform is easily crystallized, thus making it difficult to form the preform into a fiber. Accordingly, the average Cl concentration is preferably 10,000 atomic ppm or less.

Figure 7:
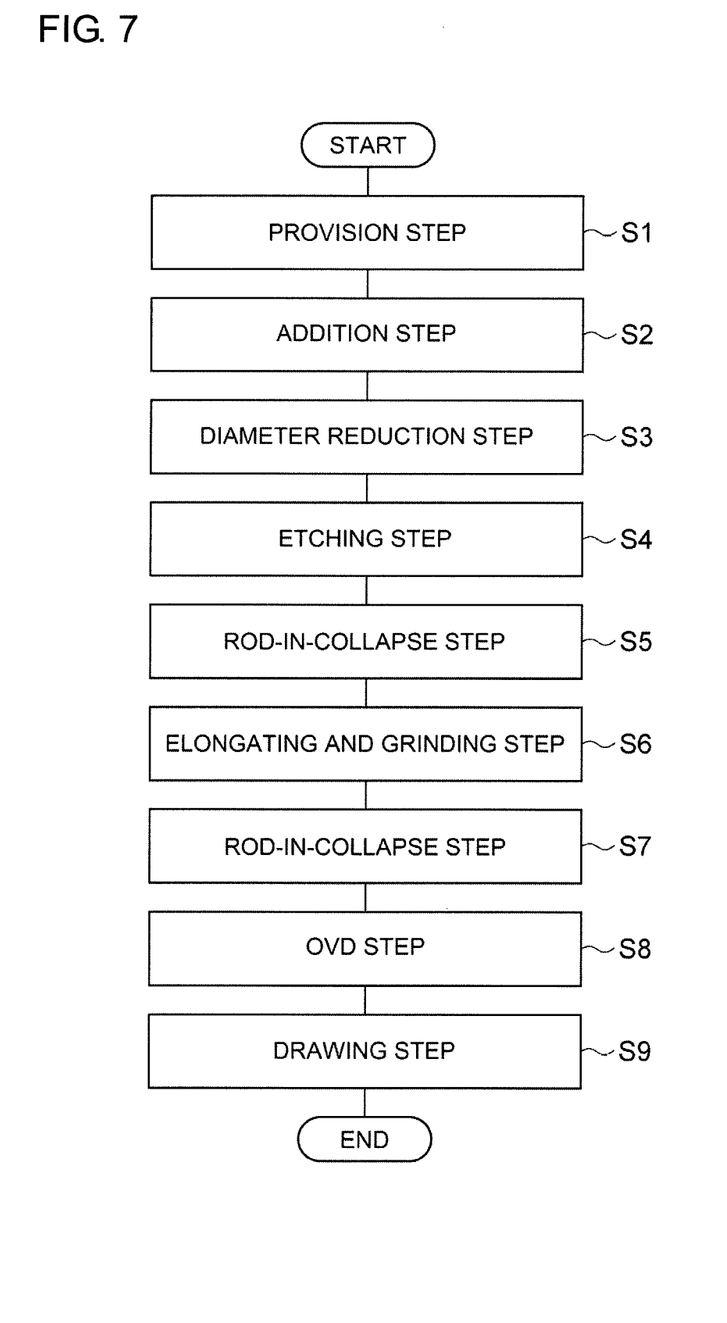
FIG. 7 is a flow chart illustrating an example of steps in the production of an optical fiber preform according to an embodiment of the present invention and an optical fiber.

FIG. 7 is a flow chart illustrating an example of steps in the production of an optical fiber preform according to an embodiment of the present invention and an optical fiber. Hereinafter, examples of conditions in the steps are also described.

In a provision step (step S1), a silica-based glass pipe into which the first dopant is to be diffused is provided. The silica-based glass pipe contains 100 to 1,000 atomic ppm chlorine (Cl) and 6,000 to 10,000 atomic ppm fluorine, and contains other dopants and impurities in a concentration of 10 mol ppm or less. The silica-based glass pipe has an outside diameter of about 35 mm and an inside diameter of about 20 mm.

In an addition step (step S2), potassium serving as the first dopant is added to the inner surface of the silica-based glass pipe. Potassium bromide (KBr) is used as a source material. The source material is heated to 900° C. to 1,000° C. with a heat source to generate the vapor of the source material. The silica-based glass pipe is heated from the outside with an oxyhydrogen burner so as to have an outer surface temperature of 2,100° C. to 2,200° C. while the source material vapor is introduced into the silica-based glass pipe together with an oxygen carrier gas introduced thereinto at a flow rate of 1 SLM (1 L/min in terms of the standard state). At this time, heating is performed a total of 15 turns by traversing the burner at a speed of 40 to 60 mm/min, thereby adding potassium to the inner surface of the silica-based glass pipe by diffusion.

In a diameter reduction step (step S3), the silica-based glass pipe doped with potassium is reduced in diameter. The silica-based glass pipe is heated with an external heat source so as to have an outer surface temperature of 2,200° C. to 2,300° C. while oxygen is allowed to flow through the inside of the silica-based glass pipe at a flow rate of 0.5 SLM. By traversing the external heat source, heating is performed a total of 6 to 10 turns to reduce the diameter until the silica-based glass pipe has an inside diameter of about 5 mm.

In an etching step (step S4), the inner surface of the silica-based glass pipe is etched. The silica-based glass pipe is subjected to vapor-phase etching by heating with the external heat source while a gas mixture of $SF_6$ (0.2 SLM) and chlorine (0.5 SLM) is introduced into the silica-based glass pipe. This etches the inner surface of the pipe containing impurities, which have been added thereto together with the intended dopant, in high concentrations, thereby removing the impurities.

In a rod-in-collapse step (step S5), a calcium-doped rod, produced in advance, having a diameter of 5 mm is inserted into the silica-based glass pipe doped with potassium. The silica-based glass pipe is collapsed at a surface temperature of 2,200° C. to 2,300° C. while the absolute pressure in the silica-based glass pipe is reduced to 97 kPa or less and while a gas mixture of oxygen (0.1 SLM) and He (1 SLM) is introduced into the silica-based glass pipe. The collapse step provides a core portion (with an outside diameter of about 25 mm) formed of a first core portion containing calcium (second dopant) and a second core portion containing potassium (first dopant). A dopant-free third core portion may be provided on the outer side of the second core portion by, for example, an outside vapor deposition (OVD) method or a collapse method.

In an elongating and grinding step (step S6), the core portion is elongated so as to have a diameter of 24 mm. Furthermore, the peripheral portion of the core portion is ground in such a manner that the core portion has a diameter of 17 mm.

In a rod-in-collapse step (step S7), a first cladding portion is disposed on the outer side of the core portion. At this time, a rod-in-collapse method is employed in which the core portion is inserted into a silica-based glass pipe doped with fluorine and both are integrated with each other by heating with an external heat source to form a rod. The relative difference in refractive index between the core portion and the first cladding portion is up to about 0.34%. The use of the rod-in-collapse method results in sufficiently low water contents of the core portion and the first cladding portion in the vicinity thereof.

In an outside vapor deposition (OVD) step (step S8), the rod formed by integrating the core portion with the first cladding portion is elongated so as to have a predetermined diameter, and then a second cladding portion containing fluorine is formed on the outer side of the rod by the OVD method to produce an optical fiber preform.

In a drawing step (step S9), the optical fiber preform produced by the method for producing an optical fiber preform described above is drawn at a drawing rate of 2,300 m/min and a drawing tension of 0.5 N to provide an optical fiber.

Measurement of the residual stress distribution of the optical fiber produced under the foregoing conditions revealed that there was a small difference in stress of 5 MPa or less in a region extending from the core center to the cladding. The resulting optical fiber had a attenuation of 0.160 dB/km or less at a wavelength of 1,550 nm.

What is claimed is:

1. An optical fiber preform comprising:
   a core portion composed of a silica glass; and
   a cladding portion surrounding the core portion, the cladding portion being composed of a fluorine-containing silica glass having a lower refractive index than the core portion, the core portion including:
      a first region that does not include a central axis of the core portion, the first region containing a first dopant selected from sodium, potassium, and compounds thereof, and
      a second region that includes the central axis of the core portion, the second region containing a second dopant that reduces viscosity of the silica glass, the second dopant having a diffusion coefficient of $1\times10^{-12}$ cm$^2$/s or more and less than the first dopant at a temperature of 2,000° C. to 2,300° C.,
   wherein the first dopant has a peak concentration at a radius $r_1$ in the core portion and the core portion has an outer radius $r_2$ and a ratio ($r_2/r_1$) is in the range of 3 to 9.5,
   the entire core portion has an average first dopant concentration of 10 atomic ppm or more and 2,000 atomic ppm or less, and
   the entire core portion has an average second dopant concentration of 10 atomic ppm or more.

2. The optical fiber preform according to claim 1, wherein the second dopant is any one selected from Rb, Cs, Mg, Ca, and Sr.

3. The optical fiber preform according to claim 1, wherein the entire core portion has an average Cl concentration of 10 atomic ppm or more and 10,000 atomic ppm or less.

4. The optical fiber preform according to claim 2, wherein the entire core portion has an average Cl concentration of 10 atomic ppm or more and 10,000 atomic ppm or less.

5. An optical fiber preform comprising:
   a core portion composed of a silica glass; and
   a cladding portion surrounding the core portion, the cladding portion being composed of a fluorine-containing silica glass having a lower refractive index than the core portion, the core portion including:
      a first region that does not include a central axis of the core portion, the first region containing a first dopant selected from sodium, potassium, and compounds thereof, and
      a second region that includes the central axis of the core portion, the second region containing a second dopant that reduces viscosity of the silica glass, the second dopant having a diffusion coefficient of $1\times10^{-12}$ cm$^2$/s or more and less than the first dopant at a temperature of 2,000° C. to 2,300° C.,
   wherein the first dopant has a peak concentration at a radius $r_1$ in the core portion, the radius $r_1$ being larger than a radius at which the second dopant has a peak concentration,
   the entire core portion has an average first dopant concentration of 10 atomic ppm or more and 2,000 atomic ppm or less, and
   the entire core portion has an average second dopant concentration of 10 atomic ppm or more.

6. The optical fiber preform according to claim 5, wherein the second dopant is any one selected from Rb, Cs, Mg, Ca, and Sr.

7. The optical fiber preform according to claim 5, wherein the core portion has an outer radius $r_2$, and a ratio ($r_2/r_1$) is in the range of 3 to 9.5.

8. The optical fiber preform according to claim 5, wherein the entire core portion has an average Cl concentration of 10 atomic ppm or more and 10,000 atomic ppm or less.

9. The optical fiber preform according to claim 6, wherein the entire core portion has an average Cl concentration of 10 atomic ppm or more and 10,000 atomic ppm or less.

10. The optical fiber preform according to claim 7, wherein the entire core portion has an average Cl concentration of 10 atomic ppm or more and 10,000 atomic ppm or less.

* * * * *